D. M. HENNING.
BILL FORM.
APPLICATION FILED APR. 7, 1917.

1,272,258.

Patented July 9, 1918.

WITNESSES
Jas. K. McCatheran
F. T. Chapman

D. M. Henning, INVENTOR

BY E. G. Siggers
      G. B. Siggers
ATTORNEYS

UNITED STATES PATENT OFFICE.

DAVID MAX HENNING, OF MEMPHIS, TENNESSEE.

BILL-FORM.

1,272,258. Specification of Letters Patent. Patented July 9, 1918.

Application filed April 7, 1917. Serial No. 160,437.

*To all whom it may concern:*

Be it known that I, DAVID MAX HENNING, a citizen of the United States, residing at Memphis, in the county of Shelby and State of Tennessee, have invented certain new and useful Improvements in Bill-Forms, of which the following is a specification.

This invention has reference to bill forms, and its object is to provide a form for rendering an itemized bill of goods purchased and arranged for the preparation of a check or draft for the payment of the amount of the bill or any part thereof, whereby the check or draft must be deposited in a bank to be returned to the person against whom the bill is rendered, with the indorsed check constituting a receipt, the bill and check being both upon a single piece of paper, and so related that the bill is incomplete without that portion containing the check.

In accordance with the invention a bill head form is printed upon one face of a sheet of paper, so that an itemized bill may be rendered upon the form for the goods purchased. Printed upon the reverse face of the form and opposite that part constituting the bill head and identifying the concern rendering the bill and the person against whom the bill is rendered, is printed a blank check or draft which the recipient of the bill may fill out and make payable at a desired bank, whereupon the sheet of paper containing the rendered bill and made out check is returned to the sender of the bill. Then the concern sending the bill indorses the check in the usual manner in a space provided therefor and deposits the check in a bank for collection, the bill, being on the same sheet of paper, necessarily accompanying the check. In the usual course of business the check with the bill is transmitted to the paying bank to be there charged against the account of the person drawing the check, and ultimately the bill and check are delivered to the purchaser, who thereupon is the possessor of both the bill and the check and is thus not only apprised of the receipt of the check by the sender of the bill, but has possession of the bill itself, so that the latter is evidence of the purpose of the check.

The invention is designed to save both time and expense, since the sender of the bill may mail it to the purchaser, who fills out the blank check and returns it to the sender, and the latter then has only to deposit the check with the accompanying bill in a bank, and all further trouble and expense is borne by the bank, both sender and purchaser being relieved from considerable correspondence and expense in postage.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claim.

In the drawings:—

Figure 1 is a face view of a bill containing certain printed matter and spaces for written matter identifying the purchaser, the articles purchased, and other matter.

Fig. 2 is a similar view of the opposite face of the bill showing a draft which may be printed in blank and filled out to the necessary extent by the purchaser.

Referring to the drawings, there is shown a sheet 1 which may be considered as a paper sheet, with a bill head 2 printed at one end said bill head containing spaces 3, 4 for the name and address of the purchaser or the party against whom the bill is rendered, and for a date.

The remainer of the sheet 1, indicated at 5, has lines and words printed thereon for facilitating the writing in of the purchases in the usual manner of making out an itemized bill. Since the sheet 1 is usually made considerably larger than customary sizes of envelops, fold lines 6 may be indicated, although, of course, such lines may be omitted.

On that face of the sheet 1 remote from the bill head 2 there is printed a blank check or draft 7, and as the check is to be made out to the sender of the bill, the printing may include the name and address of the sender of the bill, thus avoiding the necessity of the purchaser filling in such particular part of the check or draft, and also avoiding the chance of mistake in this particular.

The check may contain a space 8 whereby the check may be made a sight draft by the sender, and other spaces 9, 10, and 11 are provided for filling in the amount, signing the check and filling in the name of the bank on which the check is drawn. The check 7 may also contain spaces 12, 13 and 14 for a number, date, and amount in figures of the sum for which the check is drawn.

The check may be purposely so printed that it does not encroach upon the higher fold line 6, and between such fold line and the next lower one there is provided a space 15 for indorsements, said space having a suitable heading for the purpose.

As an example of the use of the invention, it may be assumed that a purchaser, indicated as Richard Roe, has obtained goods from B. C. Co. on credit. At the proper time, say, at the first of the following month, a bill is rendered on the bill head containing the name and address of the purchaser, while the space below the bill head is filled in with the names of the items purchased and the amounts, together with a notation of any balance due from a prior statement and a credit for any amount that may have been paid thereon.

Such bill containing the blank check 7 on the reverse side is forwarded to the purchaser, (Richard Roe) say, by mail. When the purchaser desires to pay the bill, or make a payment thereon, he has but to fill out the blank check on the back of the bill head, either for the full amount of the bill or any part thereof, making the check payable by the purchaser's bank, and signing the check to validate it.

The bill with the filled in check as an integral part thereof is now forwarded, as by mail, to the sender of the bill, (B. C. Co.).

Upon receipt of the bill and check by the sender of the bill the latter has but to indorse the check in the space provided for indorsements and deposit it in a bank, the sender being relieved of further correspondence with the purchaser.

The bank then attends to the collection of the check, sending it in the usual course of business to the paying bank upon which the check is drawn, and the latter bank attends to the delivery of the bill and check to the purchaser, who thereby not only has a receipt, but the accompanying bill both integrally connected, and furthermore has the paid check as an integral part of the bill and as a safeguard against any attempt on the part of the sender of the bill to again collect it.

The invention requires but one way transmission on the part of the sender of the bill and the purchaser, all further care and expense being assumed by the banks. Furthermore, the chances of mistake are reduced or entirely eliminated, and business is facilitated, especially in the case of the concern sending out the bills where great numbers of such bills may be rendered monthly.

The invention is particularly useful in the case of guardians, trustees, or other similarly responsible people who are required to render itemized accounts and furnish vouchers for the payment of the accounts. For instance, suppose the purchases are made by some person under the control of a guardian, and the bill is rendered to the purchaser, while payment is made by the guardian. In such case the rendering of an account by the guardian is greatly simplified because all the material entering into the transaction and on which report must be made is included in one paper, so that liability of misplacing or misassembling the papers in submitting the report is entirely obviated, the whole transaction being far simpler than is the case where a bill is sent and afterward payment is made as by a separate check, which is perhaps first received by the maker of the check only after the lapse of considerable time and at another time than the return of the bill, thus requiring great care in the proper keeping of accounts.

What is claimed is:—

A combined bill and negotiable instrument to be used in submitting statements of account, comprising a sheet of paper having a bill head occupying the entire face of one side of the sheet, to be filled out by the merchant before mailing the same to a customer, the other face containing a blank check or draft, with spaces to be filled out by the customer for the payment of the amount of the bill rendered by the merchant.

In testimony whereof I affix my signature in the presence of two witnesses.

DAVID MAX HENNING.

Witnesses:
B. G. HENNING,
D. M. KIDD.